United States Patent
Eriksson et al.

(10) Patent No.: US 9,020,550 B2
(45) Date of Patent: Apr. 28, 2015

(54) METHODS AND APPARATUSES FOR RADIO RESOURCE ALLOCATION AND IDENTIFICATION

(75) Inventors: Jonas Eriksson, Linköping (SE); Pål Frenger, Linköping (SE); Erik Larsson, Linköping (SE); Reza Moosavi, Linköping (SE); Niclas Wiberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 304 days.

(21) Appl. No.: 13/578,993

(22) PCT Filed: Mar. 29, 2010

(86) PCT No.: PCT/SE2010/050343
§ 371 (c)(1),
(2), (4) Date: Aug. 14, 2012

(87) PCT Pub. No.: WO2011/122998
PCT Pub. Date: Oct. 6, 2011

(65) Prior Publication Data
US 2012/0309441 A1     Dec. 6, 2012

(51) Int. Cl.
*H04B 7/00* (2006.01)
*H04L 5/00* (2006.01)
*H04L 1/00* (2006.01)
*H04W 72/12* (2009.01)

(52) U.S. Cl.
CPC ............ *H04L 5/0094* (2013.01); *H04L 1/007* (2013.01); *H04L 1/0072* (2013.01); *H04L 5/0092* (2013.01); *H04W 72/1289* (2013.01)

(58) Field of Classification Search
CPC ..... H04W 28/048; H04W 4/023; H04W 4/04; H04W 4/06; H04W 92/18

USPC ............. 455/161.3, 277.2, 278.1; 370/209
See application file for complete search history.

(56) References Cited

U.S. PATENT DOCUMENTS

| 2004/0166869 A1 | 8/2004 | Laroia et al. |
| 2006/0171419 A1* | 8/2006 | Spindola et al. ............. 370/477 |
| 2010/0278034 A9* | 11/2010 | Laroia et al. ................. 370/209 |

FOREIGN PATENT DOCUMENTS

| EP | 1 855 424 A1 | 11/2007 |
| WO | WO 2008/131593 A1 | 6/2008 |
| WO | WO 2008/123681 A1 | 10/2008 |
| WO | WO 2009/037328 A2 | 3/2009 |

OTHER PUBLICATIONS

International Search Report, PCT Application No. PCT/SE2010/050343, Dec. 1, 2010.

* cited by examiner

*Primary Examiner* — Tu X Nguyen
(74) *Attorney, Agent, or Firm* — Myers Bigel Sibley & Sajovec, PA

(57) ABSTRACT

The present invention presents methods providing for system resource-efficient radio resource allocation of mobile terminals. The methods may include generating a first scheduling message including first scheduling information indicative of at least a first radio resource allocated to a first mobile terminal. The methods may also include generating a second scheduling message including second scheduling information, which, when combined with said first scheduling information, is indicative of a second radio resource allocated to a second mobile terminal. The methods may further include transmitting said first scheduling message to said first and second mobile terminals using a first robustness level, and transmitting said second scheduling message to said second mobile terminal using a second robustness level. Related network nodes and mobile terminals are also provided.

18 Claims, 5 Drawing Sheets

METHODS AND APPARATUSES FOR RADIO RESOURCE ALLOCATION AND IDENTIFICATION

CROSS-REFERENCE TO RELATED APPLICATION

This application is a 35 U.S.C. §371 national stage application of PCT International Application No. PCT/SE2010/050343, filed on 29 Mar. 2010. The above-referenced PCT International Application was published in the English language as International Publication No. WO 2011/122998 A1 on 6 Oct. 2011. The disclosure of the above -referenced application is hereby incorporated herein in its entirety by reference.

TECHNICAL FIELD

The invention relates to the field of radio resource allocation, and in particular to methods and apparatuses enabling efficient allocation of radio resources to mobile terminals in radio communication networks.

BACKGROUND

Modern cellular communications standards such as EDGE (enhanced Data rates for GSM Evolution), HSDPA (High-Speed Downlink Packet Access), and LTE (Long-Term Evolution) use fast dynamic scheduling of the terminals, controlled by a base station. This allows efficient utilization of the radio resources in the presence of fast varying traffic and radio conditions.

These systems not only schedule different terminals over time, but also allow multiple terminals to be scheduled simultaneously using different radio resources, such as channelization (or spreading) codes or frequency allocations, thereby allowing a very efficient usage of the radio resources.

Fast dynamic scheduling requires scheduling information to be sent from the base station to the terminals. The scheduling information typically includes the identity of the terminal(s) being scheduled and the radio resources allocated to each terminal. The radio resources can for example be time slots, channelization (spreading) codes, frequency allocation, and spatial allocation, depending on the technology. In addition, other transmission-related information such as modulation format, code rate, transmission precoding weights, and rank can be sent along with the scheduling information.

Because of the desire to adapt the transmission to fast changes, the scheduling information need to be transmitted very often. For instance, in the HSDPA standard the scheduling information is sent with a 2 ms period, and in the LTE standard it is sent with a 1 ms period. The scheduling information is in most cases sent separately to each scheduled terminal. For instance, in the HSDPA standard the HS-SCCH channel (High-Speed Shared Control CHannel) is used to send scheduling information to a terminal. In the LTE standard the PDCCH channel (Physical Dedicated Control CHannel) is used for the same purpose. In the literature it has also been proposed to combine the scheduling information into a single larger scheduling message that is sent to all terminals.

The scheduling messages need to be transmitted with high enough robustness so that the scheduled terminal can receive it with sufficient reliability, since a missed scheduling message means that the scheduled radio resources will be wasted. At the same time, it is desired that the transmission of the scheduling message uses as little system resources as possible, not to waste system resources such as bandwidth, transmission power etc. that could otherwise be used for transmission of regular user data. Therefore, the robustness of each scheduling message is in many cases adapted to the radio conditions of the intended terminal. In the case of HSDPA, the transmission power of the HS-SCCH channel can be adapted dynamically based on the expected radio conditions of the intended terminal, thereby optimizing the system resources used for the scheduling information. In LTE, both the transmission power and the code rate of the PDCCH channel can be adapted dynamically for the same purpose.

Nevertheless, transmission of scheduling information generally uses a lot of system resources and it would be desirable to find a way to release at least some of those system resources so that they could be used for transmission of user data.

SUMMARY

It is an object of the invention to reduce the amount of system resources required for transmission of scheduling information in a radio communications system, such as an HSDPA or an LTE network.

Basically, this object is achieved by generating correlated scheduling information for different mobile terminals, and using the correlation of the scheduling information to reduce the amount of system resources required to schedule the mobile terminals of the network. The correlation occurs because the radio resources are shared between the mobile terminals, so that resources allocated to one terminal cannot be used by another terminal.

As used herein, scheduling of a mobile terminal is the process of allocating one or several radio resources, such as time slots, channelization codes, and/or frequencies to a mobile terminal.

According to an aspect of the invention, the object is achieved by a method for allocating radio resources to a plurality of mobile terminals including at least a first and a second mobile terminal. The method is typically implemented in a network node, such as an RBS (Radio Base Station), responsible for scheduling of mobile terminals. The method comprises the steps of:

- generating a first scheduling message comprising a first scheduling information indicative of at least a first radio resource allocated to the first mobile terminal;
- generating a second scheduling message comprising a second scheduling information which, when combined with said first scheduling information, is indicative of a second radio resource allocated to the second mobile terminal;
- transmitting the first scheduling message to the first and second mobile terminal using a first robustness level, and
- transmitting the second scheduling message to the second mobile terminal using a second robustness level.

The scheduling information may be any information indicating to a mobile terminal which radio resource or radio resources to use when communicating in a radio communications network. The scheduling information may be encoded using any known encoding technique, for example by use of bitmap-based encoding, vector-based encoding, or codebook-based encoding.

That the second scheduling information is indicative of a radio resource allocated to the second mobile terminal when combined with the first scheduling information means that the second information content is not indicative of the radio resource allocated to the second mobile terminal in itself but only when combined with the first scheduling information content. The first and second scheduling information are hence correlated such that the first scheduling information is complementary to the second scheduling information and thus required by a mobile terminal in order to interpret the second scheduling information as intended. That is to say, the second mobile terminal has to receive the first scheduling message before being able to identify the radio resource allocated to it by means of the second message.

By transmitting the first scheduling message to the first and second mobile terminal and generating the scheduling messages such that the first and second scheduling information are correlated as described above, the system resources required to schedule the mobile terminals of the network can be reduced. Since the first scheduling message is transmitted also to the second mobile terminal, this mobile terminal knows what radio resources have been allocated to the first mobile terminal, and consequently cannot be allocated to the second terminal. Thereby, some scheduling information can be left out of the second scheduling message, thus reducing the amount of scheduling information that needs to be transmitted in the network.

Furthermore, in some embodiments, the first and second mobile terminals are preferably categorized based on their current radio conditions such that the first mobile terminal is the mobile terminal experiencing the worst radio conditions. Thereby, the first robustness level may be adapted to the radio conditions of the first mobile terminal while the second robustness level may be adapted to the slightly better radio conditions of the second mobile terminal, thus allowing the second scheduling message to be transmitted using a lower robustness level. This means that mobile terminals experiencing bad radio conditions will get all their scheduling information in robustly transmitted messages, while mobile terminals experiencing better radio conditions get their scheduling information by combining those messages with other messages transmitted with less robustness, thereby saving valuable system resources. Robustness level of a transmission should herein be interpreted as a measure of radio conditions required at the receiver to make it possible to correctly decode the transmission. By radio conditions is meant the signal attenuation and distortion, as well as interference from other transmitters. The robustness level at which a certain message is transmitted can be altered by the network node e.g. by altering the transmission power, the transmission code rate and/or any other parameter setting affecting the quality of transmission.

According to an embodiment of the invention in which the first and second scheduling information are encoded as a first and second bitmap, respectively, each bitmap position is associated with a radio resource which may or may not be allocated to a mobile terminal receiving the scheduling message. In this scenario, bitmap positions of the first bitmap which are associated with radio resources allocated to the first mobile terminal are removed from the second bitmap such that the second bitmap becomes smaller in size than otherwise required to allocate the same radio resources to the second mobile terminal. In this way, if the same number of radio resources is to be allocated to the first and second mobile terminal, the second bitmap can be made smaller in size than the first bitmap.

According to another embodiment of the invention in which the first and second scheduling information is encoded using codebook-based encoding, the fact that the second mobile terminal has access to the codebook indices included in the first scheduling message, which codebook indices indicate the radio resources allocated to the first mobile terminal, allows the second scheduling information to be reduced in size. For example, the first scheduling information may be encoded based on a first codebook whereas the second scheduling information may be encoded based on a second codebook in which codebook entries of the first codebook corresponding to radio resources that are allocated to the first mobile terminal are removed, thereby reducing the size of the second codebook as compared to the first codebook. The reduction in codebook size allows the second scheduling information to be more compactly encoded than if the same radio resources was to be allocated to the second mobile terminal based on the first codebook since codebook indices having lower values can be used to point out the codebook entries of the second codebook.

According to yet another embodiment of the invention, the mobile terminals that are to be scheduled are categorized into different groups based on their current radio conditions. Mobile terminals experiencing the worst radio conditions are categorized into a first group, mobile terminals experiencing only slightly better radio conditions are categorized into a second group, and so on. A first scheduling message comprising scheduling information indicative of different radio resources allocated to the different mobile terminals of the first group is transmitted to the mobile terminals of all groups, a second scheduling message comprising scheduling information which, when combined with the scheduling information of the first scheduling message, is indicative of different radio resources allocated to the different mobile terminals of the second group is transmitted to all mobile terminals of the second group, and so on. In this scenario, the scheduling information of each message is preferably encoded in form of an allocation vector in which each vector position is assigned a value indicating which mobile terminal in the group that is to be allocated the radio resource associated with that vector position. Like in the bitmap-scenario, the second and each subsequent scheduling message can be reduced in size by removing the vector positions associated with radio resources already allocated to mobile terminals by means of previously transmitted scheduling messages.

Thus, according to all of the above embodiments, the second scheduling information is reduced in size compared to the size it would have to have if it in itself was to be indicative of the radio resource allocated to the second mobile terminal, i.e. if it was not to be combined with the correlated information of the first scheduling message. As used herein, the size of scheduling information is the number of bits required to encode the scheduling information. Thus, by generating the second scheduling information such that it is correlated to the first scheduling information, the second scheduling information can be more compactly encoded. Typically, at least when allocating the same number of radio resources to the mobile terminals that are to be scheduled, this means that each scheduling message can be more compactly encoded (i.e. be smaller in size) than each of the previously transmitted scheduling messages.

The proposed method is particularly advantageous when used for scheduling a large number of mobile terminals. In some embodiments, when there are many terminals to be scheduled, the mobile terminals are categorized into different groups based on their current radio conditions as described above.

When a large number of mobile terminals are to be scheduled, the method may, in some embodiments, comprise the steps of:

categorizing the mobile terminals into a first group comprising at least one mobile terminal, and at least a second group comprising at least one mobile terminal, wherein the at least one mobile terminal of the second group experiences better radio conditions than the at least one mobile terminal of the first group, and transmitting the first scheduling message to the mobile terminals of both the first and second group using a first robustness level, and transmitting the second scheduling message to the mobile terminals of the second group using a second robustness level. Preferably, the mobile terminals are categorized such that all of the at least one mobile terminal of the second group experience better radio conditions than all of the at least one mobile terminal of the first group.

In these embodiments, the first robustness level is preferably adapted to the radio conditions of the mobile terminal of the first group experiencing the worst radio conditions, while the second robustness level preferably is adapted to the radio conditions of the mobile terminal of the second group experiencing the worst radio conditions.

According to another aspect of the invention a method is provided for identifying a radio resource allocated to a mobile terminal based on at least one scheduling message received from a network node. The method is performed in and by a mobile terminal and comprises the steps of:

receiving a first scheduling message comprising a first scheduling information indicative of at least a first radio resource allocated to another mobile terminal;

receiving a second scheduling message comprising a second scheduling information which, when combined with said first scheduling information, is indicative of at least a second radio resource allocated to the mobile terminal itself, and identifying said at least second radio resource by combining said first and second scheduling information.

A mobile terminal configured to perform this method is hence adapted for radio communication in a radio communications system in which a network node, such as an RBS, allocates radio resources to mobile terminals according to the previously described principles.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
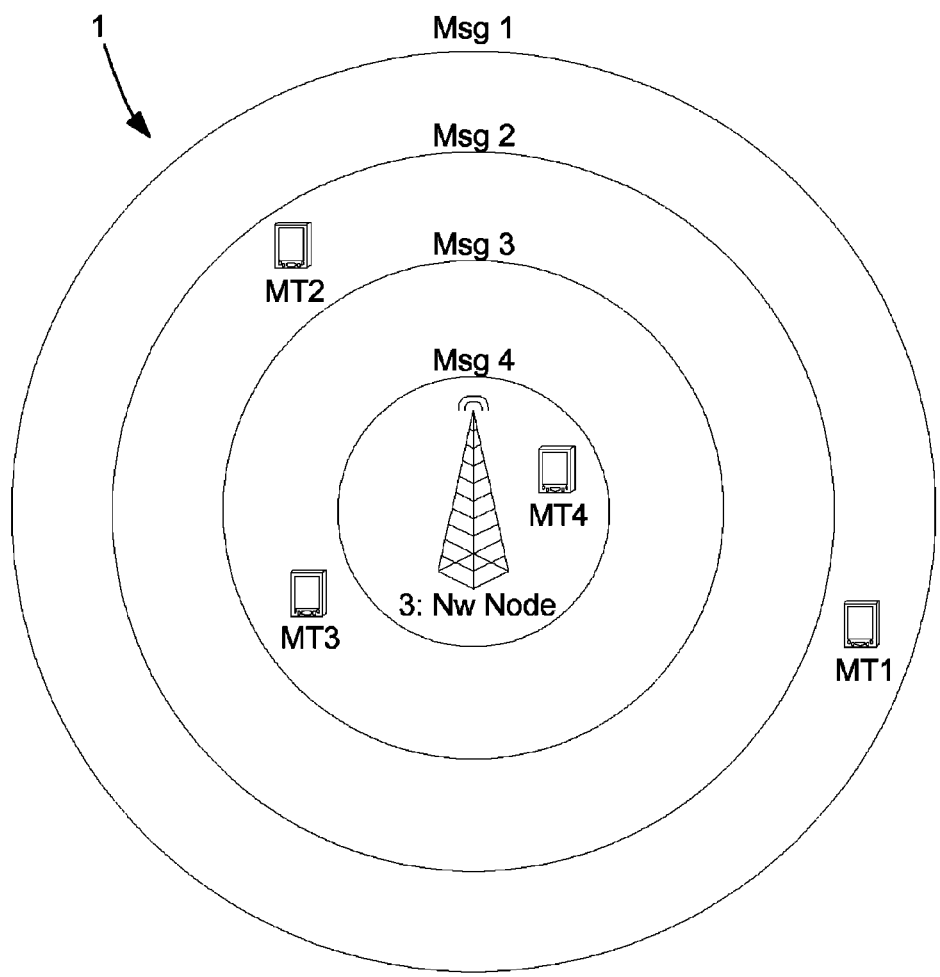
FIG. 1 illustrates a radio communications system in which a network node according to the invention transmits scheduling information to mobile terminals.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the scope of the invention as defined by the appended claims.

FIG. 1 illustrates a radio communications system 1 in which a network node 3, typically an RBS, transmits scheduling information to mobile terminals MT1-MT4. The scheduling information is transmitted in form of scheduling messages Msg1-Msg4 comprising scheduling information indicating radio resources such as time slots, channelization codes, frequencies etc. that are to be allocated to the mobile terminals, either permanently, until new scheduling information is transmitted, or for a certain time period.

The scheduling messages Msg1-Msg4 are represented by concentric circles, each having a radius figuratively representing the robustness level at which the respective scheduling message is transmitted by the network node 3. The network node 3 is configured to categorize the mobile terminals MT1-MT4 based on their current radio conditions such that the first mobile terminal MT1 is the mobile terminal experiencing the worst radio conditions and so on, and adapting the robustness level at which the respective scheduling message Msg1-Msg4 is transmitted to the radio conditions of the mobile terminal MT1-MT4 for which the message is intended. This means that the network node 3 adapts the transmission power, transmission code rate and/or other variables affecting the probability that the message reaches the intended mobile terminal, so as to ensure that all mobile terminals that need access to the information in a certain scheduling message receive that message.

The radio conditions of the respective mobile terminal MT1-MT4 may be reported to the network node 3 by the mobile terminals themselves, or be estimated by the network node 3 based on downlink/uplink signal quality in ways well known in the art. For the sake of simplicity, in the exemplary scenario illustrated in FIG. 1, the radio condition of a mobile terminal MT1-MT4 is shown to deteriorate with increasing distance from the network node 3. However, as appreciated by any person skilled in the art, the radio condition of a mobile terminal does not only depend on the distance to the network node to which it is connected.

In this scenario, the first scheduling message Msg1 is hence transmitted on a robustness level adapted to the radio conditions of the first mobile terminal MT1, the second scheduling message Msg2 is transmitted on a robustness level adapted to the radio conditions of the second mobile terminal MT2, the third scheduling message Msg3 is transmitted on a robustness level adapted to the radio conditions of the third mobile terminal MT3, and the fourth scheduling message Msg4 is transmitted on a robustness level adapted to the radio conditions of the fourth mobile terminal MT4. The scheduling messages Msg1-Msg4 are typically encoded by the network node 3 such that they can be read by any mobile terminal receiving them. In this way, each scheduling message will be received and read by (at least) all mobile terminals experiencing as good, or better radio conditions than the mobile terminal to which the robustness level of transmission is adapted. The mobile terminal experiencing the radio conditions to which the robustness level is adapted and all mobile terminals experiencing equal or better radio conditions than that mobile terminal will hereinafter sometimes be referred to as the intended recipients of that scheduling message.

The network node 3 is further configured to adapt the scheduling information of the scheduling messages Msg1-Msg4 to the radio conditions of the mobile terminals MT1-MT4. To this end, the scheduling messages are generated such that the scheduling information in the first scheduling message Msg1 is indicative of radio resources allocated to the first mobile terminal MT1, the scheduling information in the second scheduling message Msg2 is indicative of radio resources allocated to the second mobile terminal MT2 when combined with the scheduling information of the first scheduling message Msg1, the scheduling information in the third scheduling message Msg3 is indicative of radio resources allocated to the third mobile terminal MT3 when combined with the scheduling information of all previous scheduling messages (i.e. the scheduling messages transmitted at a robustness level adapted to mobile terminals experiencing worse radio conditions), and so on. This means that a mobile terminal number M in the order of improving radio conditions (poor to good) has to read scheduling messages 1 to M to get the scheduling information indicating what radio resources to use when communicating in the radio communications system 1.

Figure 2:
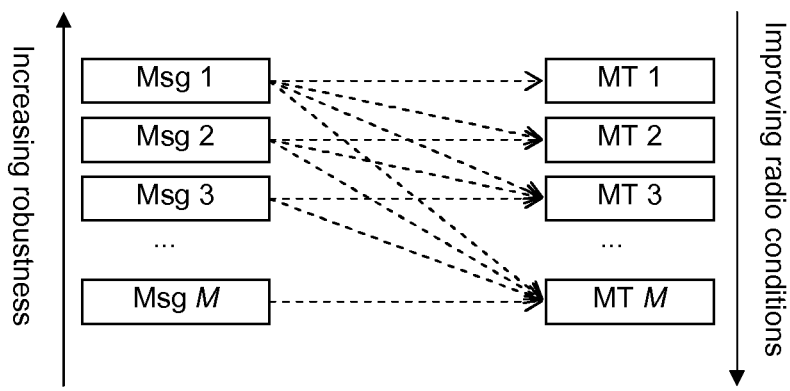
FIG. 2 illustrates an example of how scheduling messages may be transmitted to mobile terminals in a radio communications system according an aspect of the invention.

FIG. 2 illustrates the above described principle of radio resource allocation. Here, a radio network node (not shown) schedules the mobile terminals MT1-MTM of the network by transmitting correlated scheduling messages Msg1-MsgM. The mobile terminals have been categorized by the network node based on their radio conditions, and a first scheduling message Msg1 indicating the radio resources allocated to a first mobile terminal MT1 experiencing the worst radio conditions is transmitted to all mobile terminals MT1-MTM using a first robustness level adapted to the poor radio conditions of the first mobile terminal MT1. Then a second scheduling message Msg2 which, when combined with the first scheduling message Msg1, indicates the radio resources allocated to a second mobile terminal MT2 experiencing the second worst radio conditions is transmitted to the mobile terminals MT2-MTM using a second robustness level which is lower than the first robustness level and adapted to the slightly better radio conditions of the second mobile terminal MT2, and so on.

Figure 3:
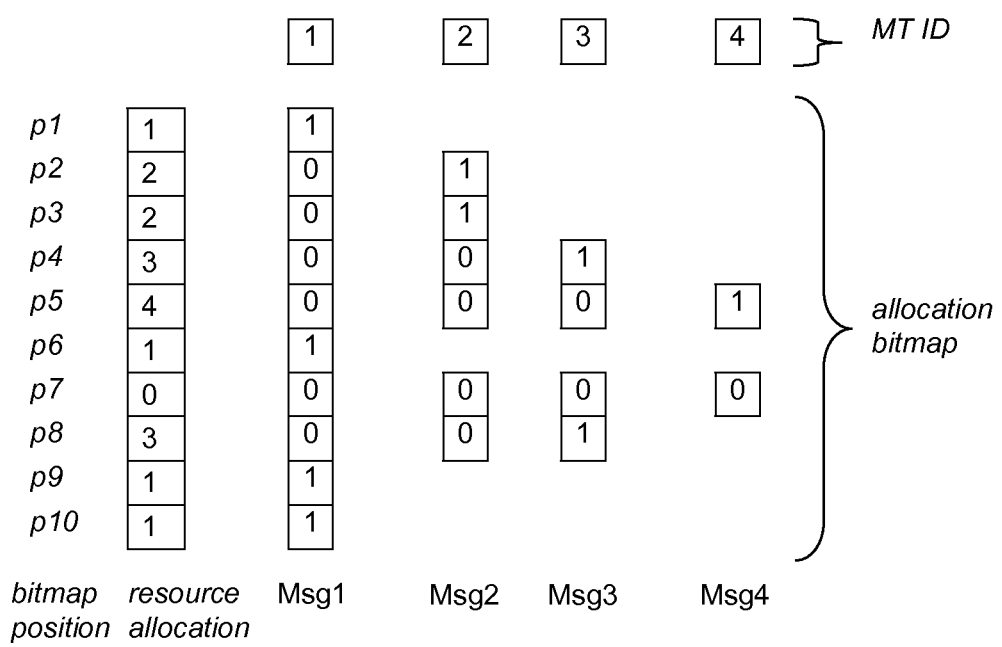
FIG. 3 illustrates an example of how the scheduling messages in FIG. 2 may be encoded.

FIG. 3 illustrates an example of how the scheduling messages Msg1-MsgM in FIG. 2 may be encoded according to one embodiment of the invention. For the sake of simplicity, M is set to 4 in this example, meaning that there are no more than four mobile terminals to be scheduled.

The scheduling information is encoded using allocation bitmaps in which each bitmap position p1-p10 corresponds to a radio resource which may or may not be allocated to a mobile terminal. The column named resource allocation illustrates how available radio resources are to be allocated to four mobile terminals MT1-MT4. Each of a plurality of bitmap positions p1-p10 is seen to be assigned a number indicating either to which mobile terminal a radio resource associated with that bitmap position is allocated (numbers 1-4), or that the radio resource associated with that bitmap position is not allocated to any mobile terminal (number 0).

Each scheduling message Msg1-Msg4 comprises a mobile terminal identification number (MT ID) identifying the mobile terminal for which the scheduling message is intended. The network node responsible for the radio resource allocation may be configured to assign mobile terminal identification numbers to the mobile terminals. In this case, the mobile terminals are preferably assigned as low identification numbers as possible (for example starting from zero or one, and up) so as to minimize the number of bits required to signalling the identification numbers to the terminals. For example, the network node may be configured to assign mobile terminal identification numbers to the terminals based on their radio conditions, such that the first mobile terminal experiencing the worst radio conditions is assigned the lowest identification number, the second mobile terminal experiencing the second worst radio conditions is assigned the second lowest identification number, and so on. In this exemplary embodiment, the first mobile terminal MT1 is assigned mobile identification number 1, the second mobile terminal MT2 is assigned mobile identification number 2, and so on. The mobile terminal identification numbers may then be communicated to the mobile terminals so that they can identify the scheduling message carrying their scheduling information. However, other mobile terminal identification numbers which are independent of the radio conditions of the terminals may also be used. For example, according to other embodiments, mobile terminal identification numbers that are permanently assigned to the terminals may be used.

Furthermore, each scheduling message Msg1-Msg4 comprises a bitmap in which each bitmap position may be assigned the value one, indicating that the radio resource associated with that bitmap position is allocated to the mobile terminal identified by the mobile terminal identification number of the scheduling message, or the value zero, indicating that it is not.

In this example, there is a finite set of ten radio resources to be allocated. For example, the set of radio resources may be the set of channelization codes in HSDPA or the set of resource blocks in LTE. If we assume that there are K radio resources in a finite set of radio resources to be allocated to mobile terminals using a bitmap encoding scheme according to prior art, the scheduling messages transmitted to the mobile terminals would all include a bitmap of size K. According to the proposed bitmap encoding scheme, however, only the bitmap of the first scheduling message Msg1 has the size K, whereas the bitmap of the second scheduling message Msg2 is shortened by removing the bitmap positions p1, p6, p9, p10 associated with radio resources allocated to the first mobile terminal MT1 and thus known to be zeros by the second mobile terminal MT2. Such a shortened bitmap will henceforth sometimes be referred to as a delta bitmap. Thus, if a1 radio resources of the finite set of K radio resources are allocated to the first mobile terminal MT1, the size of the delta bitmap of the second scheduling message Msg2 is K-a1. Similarly, in the third scheduling message Msg3, the bitmap positions p1-p3, p6, p9, p10 associated with radio resources allocated to the first and the second mobile terminals MT1, MT2 are removed, and so on.

The network node may additionally be configured to further reduce the size of the bitmaps in the scheduling messages Msg1-Msg4 by using well-known techniques such as run-length coding and Huffman coding.

The second mobile terminal MT2 is configured to identify the radio resources allocated to it in the second scheduling message Msg2 by combining the scheduling information of the second scheduling message Msg2 with the scheduling information of the first scheduling message Msg1. This is achieved by identifying bitmap positions of the second scheduling message Msg2 with bitmap positions of the first scheduling message Msg1 which are not allocated to the first mobile terminal MT1. In more detail, the second mobile terminal MT2 is configured to identify the first bitmap position of the second scheduling message Msg2 as the first bitmap position of the first scheduling message Msg1 not allocated to the first mobile terminal MT1 (i.e. bitmap position p2), the second bitmap position of the second scheduling message Msg2 as the second bitmap position of the first scheduling message Msg1 not allocated to the first mobile terminal MT1 (i.e. bitmap position p3), and so on. Thereby, the second mobile terminal MT2 would in this exemplary scenario identify its allocated radio resources as the radio resources associated with the bitmap positions p2 and p3.

The proposed principle of differential signalling of scheduling information using "delta bitmaps" reduces the amount of scheduling information that has to be transmitted to the mobile terminals by the network node that is responsible for radio resource allocation. It may also reduce the requirements of transmission power and/or code rate since the scheduling messages may be transmitted with a robustness level adapted to the intended recipients.

According to another embodiment, the network node responsible for radio resource allocation is configured to divide the mobile terminals that are to be scheduled into groups based on their radio conditions. For example, the mobile terminals can be divided into three groups, where the mobile terminals experiencing the worst radio conditions are placed in the first group, those experiencing medium radio conditions are placed in the second group, and those experiencing the best radio conditions are placed in the third group. The network node then generates three scheduling messages, one for each group, and transmits the scheduling messages on a robustness level adapted to the radio conditions of the mobile terminal experiencing the worst radio conditions in each group. The content of the scheduling message for the first group is indicative of the radio resources allocated to the mobile terminals of the first group, whereas the contents of the scheduling messages for the second group, third group, and so on, are indicative of the radio resources allocated to the mobile terminals of the respective group only when combined with the contents of scheduling messages transmitted to groups of mobile terminals experiencing worse radio conditions. Dividing mobile terminals into different groups based on their radio conditions and transmit a single scheduling message to each group of mobile terminals is particularly advantageous in cases where many mobile terminals are to be scheduled.

Figure 4:
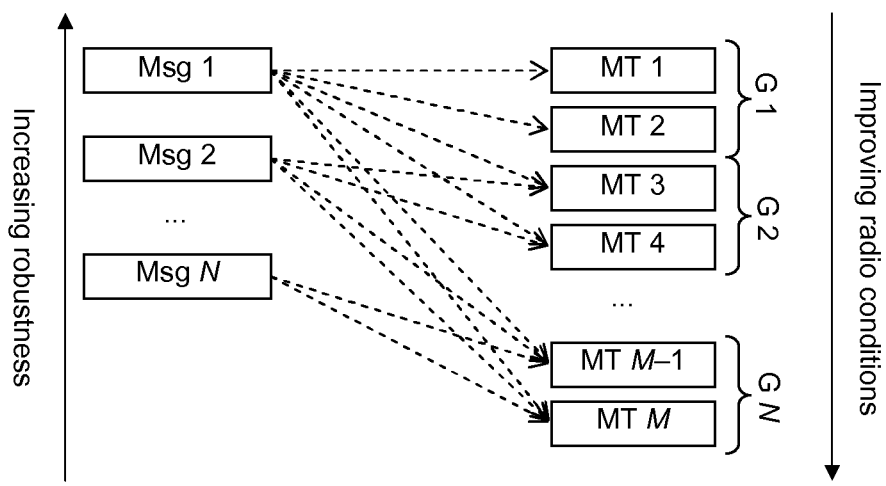
FIG. 4 illustrates an example of how scheduling messages may be transmitted to mobile terminals in a radio communications network according another aspect of the invention.

FIG. 4 illustrates the above described principle of grouping mobile terminals MT1-MTM into groups G1-GN based on their radio conditions and transmitting correlated scheduling messages Msg1-MsgN to the different groups.

Figure 5:
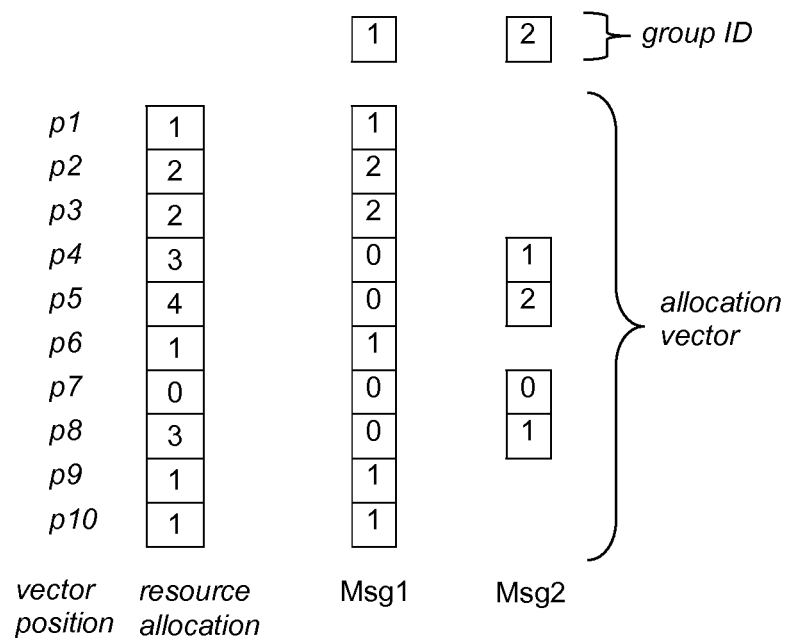
FIG. 5 illustrates an example of how the scheduling messages in FIG. 4 may be encoded.

FIG. 5 illustrates an example of how the scheduling information of the scheduling messages Msg1-MsgN in FIG. 4 may be encoded according to one embodiment of the invention. For the sake of simplicity, M is set to 4 also in this example, meaning that there are four mobile terminals to be scheduled.

The scheduling information is encoded using allocation vectors in which each of a plurality of vector positions p1-p10 corresponds to a radio resource which may or may not be allocated to a mobile terminal. The column named resource allocation illustrates how available radio resources are to be allocated to four mobile terminals MT1-MT4. A vector position assigned a zero indicates that the radio resource associated with that vector position is not allocated to any mobile terminal.

The network node responsible for radio resource allocation is configured to assign a group identification number (group ID) to each group G1, G2. Preferably, the groups are assigned as low group identification numbers as possible (for example starting from zero or one, and up) so as to minimize the number of bits required to signalling the group ID to the terminals. For example, the first group G1 comprising the mobile terminals experiencing the worst radio conditions may be assigned the lowest group identification number, the second group G2 comprising the mobile terminals experiencing the second worst radio conditions may be assigned the second lowest group identification number, and so on. In this exemplary embodiment, the first group is assigned group identification number 1, the second group is assigned group identification number 2, and so on. The network node is further configured to assign each of the mobile terminals MT1-MT4 a mobile terminal identification number which is unique within its group, meaning that the same mobile terminal identification number may be assigned to mobile terminals in different groups but never to mobile terminals of the same group. The mobile terminals within each group are preferably assigned as low identification numbers as possible (for example starting from zero or one, and up). For example, the mobile terminal identification numbers may be assigned based on the radio conditions of the mobile terminals within the group such that the mobile terminal experiencing the worst radio conditions within the respective group is assigned the lowest mobile terminal identification number, the mobile terminal experiencing the second worst radio conditions within the respective group is assigned the second lowest mobile terminal identification number, and so on. In this exemplary embodiment, the mobile terminal experiencing the worst radio conditions in each group is assigned mobile terminal identification number 1, the mobile terminal experiencing the second worst radio conditions in each group is assigned mobile terminal identification number 2, and so on. Each mobile terminal is then informed about its group identification number and its mobile terminal identification number by the network node.

Each scheduling message Msg1, Msg2 is seen to include the group identification number of the group of mobile terminals to be scheduled, and an allocation vector in which each vector position is assigned either a zero or a value corresponding to a mobile terminal identification number of a mobile terminal within the group. The value of a given vector position indicates either which mobile terminal within the group that is allocated the radio resource associated with that vector position, or, if zero, that the radio resource is not allocated to any mobile terminal within the group. For a given scheduling message, the number of possible values in each vector location is hence one plus the number of mobile terminals in the group for which the scheduling message is intended.

The first scheduling message Msg1 contains all information needed by the mobile terminals MT1, MT2 of the first group G1 to identify their allocated radio resources. Since, in this example, there is a finite set of ten radio resources to be allocated, the vector of the first scheduling message Msg1 has a size of ten.

The scheduling information of the second scheduling message Msg2 is a corresponding vector for the second group G2, but with vector positions associated with radio resources already allocated to the mobile terminals of the first group G1 removed. The vector of the second scheduling message Msg2 is hence smaller in size than the vector of the first scheduling message Msg1 and may, to use a terminology similar to that used for the bitmap example described above, be referred to as a delta vector. The scheduling information of subsequent scheduling messages are formed in a corresponding manner by removing the vector positions associated with radio resources allocated to mobile terminals of previous groups, i.e. to mobile terminals experiencing worse radio conditions.

The mobile terminals MT3, MT4 of the second group G2 are configured to identify the radio resources allocated to them in the second scheduling message Msg2 by combining the scheduling information of the second scheduling message Msg2 with the scheduling information of the first scheduling message Msg1. This is achieved by identifying vector positions of the second scheduling message Msg2 with vector positions of the first scheduling message Msg1 which are not allocated to mobile terminals of the first group G1. In more detail, the mobile terminals MT3, MT4 of the second group G2 are configured to identify the first vector position of the second scheduling message Msg2 as the first vector position of the first scheduling message Msg1 not allocated to a mobile terminal of the first group G1 (i.e. vector position p4), the second vector position of the second scheduling message Msg2 as the second vector position of the first scheduling message Msg1 not allocated to a mobile terminal of the first group G1 (i.e. vector position p5), and so on. Thereby, the third mobile terminal MT3 would for example identify its allocated radio resources as the radio resources associated with the vector positions p4 and p8.

By dividing the mobile terminals that are to be scheduled into groups and using vector-based encoding of scheduling information, fewer scheduling messages have to be transmitted by the network node as compared to the previously described embodiment employing bitmap-based encoding of scheduling information. This is particularly advantageous when many mobile terminals are to be scheduled.

As compared to scheduling a large number of mobile terminals by means of a single vector-encoded scheduling message which is transmitted with a robustness level adapted to the mobile terminal experiencing the worst radio condition, the proposed principle of dividing the mobile terminals into groups is advantageous for the following reasons: First, since the number of mobile terminals in each group can be kept small and since mobile terminal identification numbers can be reused in different groups, all vector positions can be assigned relatively small values. If, on the other hand, a large number of mobile terminals were to be scheduled by means of a single allocation vector, many vector positions would have to be assigned large values. Since the amount of binary data required to encode large values is bigger than the amount of binary data required to encode small values, the proposed principle may reduce the amount of scheduling information that needs to be transmitted by a network node to which many mobile terminals are connected. Secondly, since the scheduling messages sent to the groups of mobile terminals will carry less information than a single vector-encoded scheduling message carrying scheduling information for all mobile terminals that are to be scheduled, they can be compactly encoded using techniques such as runt-length coding and/or Huffman coding, both which are well-known in the art. Thirdly, when grouping mobile terminals into groups based on their radio conditions, only the first scheduling message has to be transmitted using a robustness level adapted to the mobile terminal experiencing the worst radio conditions.

Subsequent scheduling messages can be transmitted using a decreasing robustness level. Since many vector positions of the allocation vector in the first scheduling message will be assigned a zero, the first scheduling message which is the largest and most robustly transmitted scheduling message can be densely compressed using e.g. run-length and/or Huffman coding.

Although the above embodiments of differential signalling of scheduling information have been described using examples in which radio resources are to be allocated to four mobile terminals, it should be appreciated that those embodiments and any other embodiments described herein are equally applicable for any number of mobile terminals equal to or larger than two. That at least two mobile terminals are required in order to realize the invention is evident since the invention utilizes correlation between scheduling information of different scheduling messages. However, in theory, there is no upper limit for the number of mobile terminals that can be scheduled using the proposed principles.

In the above examples, the scheduling messages are generated in a strict sequential order, meaning that a mobile terminal must read all previous scheduling messages transmitted by the network node in sequence and combine the scheduling information contents of all previous messages to identify its allocated radio resources. It should, however, be appreciated that the scheduling messages may be generated also in other, non-strict sequential orders. For example, the network node responsible for scheduling of mobile terminals may be configured to order the mobile terminals of the network according to a tree structure based on their radio conditions. This may be achieved by associating the mobile terminal experiencing the worst radio conditions with the root node of the tree, associating mobile terminals experiencing slightly better radio conditions with a respective first generation child node of the root node, associating mobile terminals experiencing even better radio conditions with a respective child node of a first generation child node, and so on. The network node may in this scenario be configured to generate one scheduling message for each node (i.e. each mobile terminal associated with that node) and adapt the scheduling information of the messages such that the information of messages transmitted to nodes on the same branch of the tree is correlated as described above. In this way, a mobile terminal at a certain depth in the tree structure does never have to read and combine more scheduling messages than the length of the path to the root node (measured in nodes and including itself and the root node). Scheduling of mobile terminals according to a tree structure is advantageous compared to strict sequential scheduling in that mobile terminals do not need to read as many scheduling messages, while still saving valuable system resources compared to scheduling techniques according to prior art by utilizing the correlation between different scheduling messages. It should also be appreciated that it is possible to combine the scheduling of mobile terminals in a tree structure with the principle of grouping mobile terminals into groups based on their radio conditions described above by associating each node of the tree with a group of mobile terminals rather than a single mobile terminal.

Besides the previously described encoding schemes employing allocation bitmaps or allocation vectors, the invention may also be realized using codebook-based encoding of scheduling information.

In codebook-based encoding, each mobile terminal may store one codebook (single-codebook encoding) or several codebooks (multiple-codebook encoding), each comprising a plurality of codewords of which each is associated with a radio resource or set of radio resources which may be allocated to the mobile terminal. In this scenario, the scheduling information of a scheduling message comprises at least one codebook index identifying at least one codeword of a code book. A codebook must not necessarily include all conceivable radio resources but may instead represent a quantization of those to make the encoding more compact.

Correlation between different scheduling messages may for example be used in codebook-based encoding by generating a first scheduling message comprising at least a first codebook index identifying at least one codeword in a codebook stored by all mobile terminals. Like in previous embodiments, the first scheduling message is indicative of the radio resource or resources allocated to a first mobile terminal experiencing the worst radio conditions of the mobile terminals that are to be scheduled, and is transmitted using a robustness level adapted to said first mobile terminal such that it is received also by all the other mobile terminals. Then a second scheduling message is generated, which scheduling message comprises at least one second codebook index identifying at least one codeword in a second codebook. The second codebook consists of the codewords spanning the radio resources that are not allocated by the first scheduling message. The second scheduling message is indicative of the radio resource or resources allocated to a second mobile terminal experiencing the second worst radio conditions of the mobile terminals that are to be scheduled, and is transmitted using a robustness level adapted to said second mobile terminal such that it is received also by the mobile terminals experiencing better radio conditions. Similarly, each subsequent scheduling message may be based on a new codebook in which codewords representing radio resources already allocated to mobile terminals are removed. Since the codebook becomes smaller and smaller for each scheduling message, smaller and smaller codebook index values are required to span the codewords of the codebook. This allows the use of small-valued codebook indices which in turn allows the codebook indices be encoded using small bit streams.

A slightly more sophisticated example of differential signalling using codebook-based encoding will now be described. In this example we assume that there are 16 radio resources that can be allocated, ordered in a sequential fashion. We also assume in this exemplary scenario that either four or eight adjacent resources can be allocated to one mobile terminal. The possible allocations can then be illustrated by the following codebook comprising a list of codebook entries, or codewords, in which "1" indicates an allocated radio resource:

```
1111000000000000  (codebook index 0)
0111100000000000  (codebook index 1)
0011110000000000  (codebook index 2)
...
0000000000111100  (codebook index 10)
0000000000011110  (codebook index 11)
0000000000001111  (codebook index 12)
1111111100000000  (codebook index 13)
0111111110000000  (codebook index 14)
0011111111000000  (codebook index 15)
...
0000000111111110  (codebook index 20)
0000000111111111  (codebook index 21)
```

There are hence 22 different possible sets of radio resources, each represented by a respective codeword. A set of radio resources can be allocated to a mobile terminal storing the codebook by transmitting the corresponding codebook index 0-21 to the mobile terminal in a scheduling message. To point out one of the 22 codebook indices, the scheduling information of the first scheduling message has to be encoded as a bit stream containing at least five bits.

Assume now that one set of radio resources has been allocated to a first mobile terminal by means of the first scheduling message, for instance the set of radio resources represented by codebook index 15, and that the next mobile terminal must be given an allocation that does not collide with the first one. Then most of the allocations from the original codebook are forbidden, in fact it is only the sets of radio resources represented by the codebook indices 10, 11, and 12 that are possible. Thus, we have in effect a new (second) codebook on which the second scheduling message may be based, which codebook looks like this:

0000000000111100 (codebook index 0)
0000000000011110 (codebook index 1)
0000000000001111 (codebook index 2)

The codebook index of the second scheduling message can hence assume the values 0, 1 or 2, which can be encoded using only two bits compared to the five bits for the original codebook.

More generally, when signalling the allocation to a mobile terminal N using codebook-based encoding, we take into account the already known allocations to the mobile terminals 1..N-1. When doing so, we exclude all the codebook entries for terminal N that would collide with any of the already allocated terminals, in effect forming a new, shorter codebook consisting of only the entries that are now valid. The entries in this shorter codebook are renumbered from zero and up, and the chosen allocation is indicated by sending the corresponding codebook index of that shorter codebook. This shorter codebook is not explicitly transmitted or described to the mobile terminals, it is implicitly defined (by both the network node and the mobile terminal(s)) based on the original codebook and the knowledge of the already allocated terminals.

Thus, the network node responsible for scheduling of mobile terminals is configured to, upon transmission of a scheduling message, generate a new codebook or update an original codebook by removing, from said original codebook, codebook entries (i.e. codewords) which represent radio resources that can no longer be allocated to mobile terminals to be scheduled. It is also configured to associate the remaining codebook entries with codebook indices from zero and up, and to repeat this procedure for each transmitted scheduling message. The mobile terminals in their turn store the original codebook and are configured to combine the scheduling information of a received scheduling message with the scheduling information of previously received scheduling messages in order to identify the codebook entry of the original codebook that corresponds to the codebook index of the newly received message. For example, with reference to the above example, a mobile terminal receiving the second scheduling message has, in accordance with the principles of the invention, already received the first scheduling message transmitted at a higher robustness level and indicating that the radio resources represented by codebook index 15 are allocated to another mobile terminal. The mobile terminal is further configured to exclude from the original codebook the codebook entries which, according to known (predetermined) allocation rules, cannot be allocated if the radio resources corresponding to codebook index 15 have already been allocated, thus allowing the mobile terminal to identify the codebook entries in the original codebook corresponding to codebook index 0, 1 or 2 in the second scheduling message. For example, the mobile terminal may in this way identify the set of radio resources represented by codebook index 11 in the original codebook by combing the codebook index 1 of a second scheduling message with the codebook index 15 of a first, previously received scheduling message.

Figure 6:
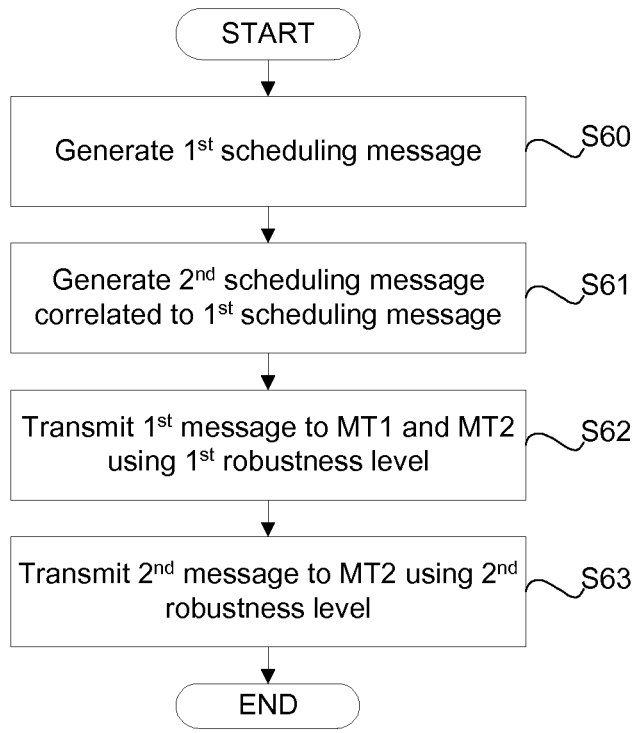
FIG. 6 is a flowchart illustrating a method performed by a network node according to an aspect of the invention.

Referring now to FIG. 6, a flowchart illustrating a method for allocating radio resources to mobile terminals according to the invention is shown. The method is performed in and by a network node responsible for scheduling of mobile terminals within a radio communications network. The method will be described below will simultaneous reference to previous drawings.

In a first step S60, a first scheduling message Msg1 is generated. The first scheduling message Msg1 comprises a first scheduling information indicative of at least a first radio resource allocated to a first mobile terminal MT1.

In a second step S61, a second scheduling message Msg2 is generated. The second scheduling message Msg2 comprises a second scheduling information which is correlated to the first scheduling information such that it is indicative of at least a second radio resource allocated to a second mobile terminal MT2 when combined with the first scheduling information. As previously described, the first and second scheduling information may be encoded e.g. using bitmap-based encoding, vector-based encoding, or codebook-based encoding, in which respective case the scheduling information would comprise an allocation bitmap, an allocation vector, or one or several codebook indices.

In a third step S62, the first scheduling message Msg1 is transmitted to both the first and second mobile terminals MT1, MT2, using a first robustness level.

In a fourth step S63, the second scheduling message Msg2 is transmitted to the second mobile terminal MT2 using a second robustness level. Typically, the scheduling messages Msg1, Msg2 are broadcasted such that they can be received and read by all mobile terminals experiencing sufficiently good radio conditions to pick up the signals carrying the messages. The network node typically orders the mobile terminals MT1, MT2 based on their radio conditions such that the first mobile terminal is the one experiencing the worst radio conditions. In this way, by adapting the first and second robustness level to the radio conditions of the first and second mobile terminal MT1, MT2, respectively, the first message Msg1 will be received by both terminals MT1, MT2 while the second message Msg2 will be received at least by the second terminal MT2.

Figure 7:
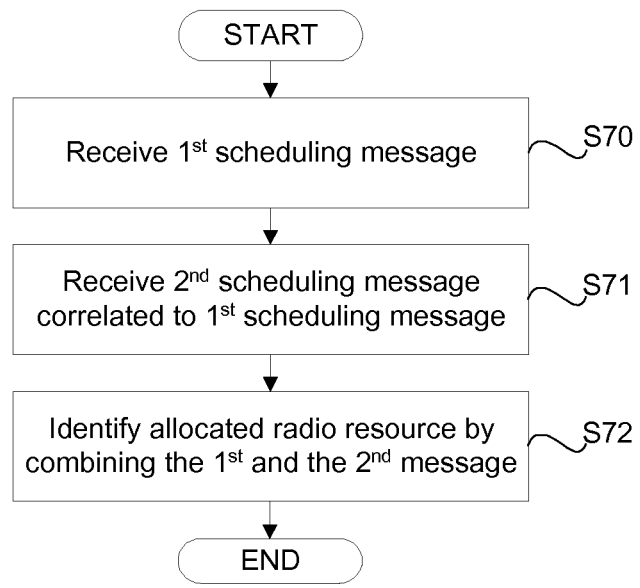
FIG. 7 is a flowchart illustrating a method performed by a mobile terminal according to an aspect of the invention.

Referring now to FIG. 7, a flowchart illustrating a method for identifying a radio resource allocated to a mobile terminal according to the invention is shown. The method is performed in and by a mobile terminal adapted to be scheduled using the principles of differential signalling of scheduling information described herein. The method will be described with simultaneous reference to previous drawings.

In a first step S70, a first scheduling message Msg1 is received by the mobile terminal MT2. This message Msg1 comprises a first scheduling information indicative of one or more radio resources allocated to another mobile terminal MT1.

In a second step S71, a second scheduling message Msg2 is received by the mobile terminal MT2. The second scheduling message Msg2 comprises a second scheduling information which is correlated to the first scheduling information such that it is indicative of at least a second radio resource allocated to the mobile terminal itself when combined with the first scheduling information.

In a third step S72, the mobile terminal MT2 identifies the at least one second radio resource by combining the first and second scheduling information. The way the first and second scheduling information are combined in order to identify the at least one second radio resource depends on how the scheduling information is encoded. Examples of how this may be achieved in the event the first and second scheduling information are encoded using bitmap-based encoding, vector-based encoding, and codebook-based encoding are given above.

Figure 8:
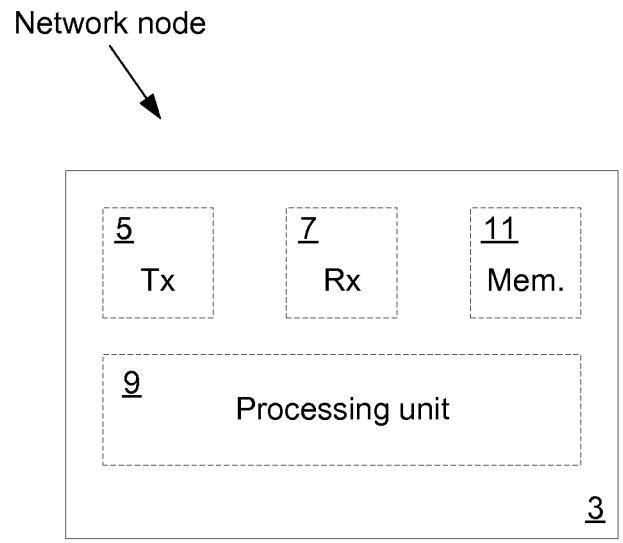
FIG. 8 illustrates a block diagram of a network node configured to allocate radio resources to mobile terminals in accordance with the principles of the invention.

FIG. 8 illustrates schematically a network node 3 of the invention. The network node 3 may, for example, be an enhanced Node B (eNB) of an LTE network, or a HSDPA base station. The network node 3 may be configured to carry out the differential signalling of scheduling information according to any of embodiments described herein. To this end, the network node 3 comprises a transmitting unit 5 allowing it to transmit information, including scheduling information, to mobile terminals. It also comprises a receiving unit 7 for receiving information from the mobile terminals, for example information indicative of the radio conditions for the respective terminal. The network node 3 further comprises a processing unit 9 and a memory 11 storing a computer program comprising computer-readable code. When the computer program is executed by the processing unit 9, the processing unit causes the network node 3 to perform the method steps described above with reference to FIG. 6, and any additional method steps performed by a network node in accordance with any of the embodiments described herein.

Figure 9:
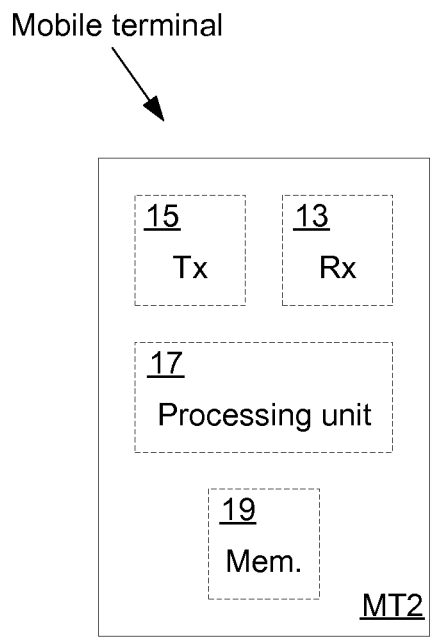
FIG. 9 illustrates a block diagram of a mobile terminal configured to identify allocated radio resources in accordance with the principles of the invention.

FIG. 9 illustrates schematically a mobile terminal MT of the invention. The mobile terminal MT is adapted for communication with network nodes in a radio communications network, such as an LTE or a HSDPA network. The mobile terminal MT may be configured to support differential signalling of scheduling information according to any of embodiments described herein. To this end, the mobile terminal MT comprises a receiving unit 13 allowing it to receive information, including scheduling information transmitted by a network node in order to allocate radio resources to mobile terminals of the network. The mobile terminal MT also comprises a transmitting unit 15 for transmitting information, for example information indicative of the current radio conditions of the mobile terminal. The mobile terminal MT further comprises a processing unit 17 and a memory 19 storing a computer program comprising computer-readable code. When the computer program is executed by the processing unit 17, the processing unit causes the mobile terminal MT to perform the method steps described above with reference to FIG. 7, and any additional method steps performed by a mobile terminal in accordance with any of the embodiments described herein.

The invention claimed is:

1. A method in a network node for allocating radio resources to a plurality of mobile terminals including at least first and second mobile terminals, the method comprising:
   generating a first scheduling message comprising first scheduling information indicative of at least a first radio resource allocated to said first mobile terminal;
   generating a second scheduling message comprising second scheduling information, which, when combined with said first scheduling information, is indicative of a second radio resource allocated to said second mobile terminal;
   transmitting said first scheduling message to said first and second mobile terminals using a first robustness level; and
   transmitting said second scheduling message to said second mobile terminal using a second robustness level.

2. Method according to claim 1, wherein generating the second scheduling message comprises generating the second scheduling message such that the second scheduling information is reduced in size compared to a size it would have if it in itself was indicative of the second radio resource allocated to the second mobile terminal, by using a correlation between said first and second scheduling information.

3. Method according to claim 1, wherein generating the second scheduling message comprises generating the second scheduling message such that the second scheduling information is smaller in size than said first scheduling message.

4. Method according to claim 1, wherein said first scheduling information is encoded as a first bitmap or vector, and wherein said second scheduling information is encoded as a second bitmap or vector in which at least one bitmap or vector position associated with a radio resource allocated to the first mobile terminal in the first scheduling message is omitted from the second scheduling information.

5. Method according to claim 1, wherein said first scheduling information is encoded based on a first codebook comprising a plurality of codebook entries, each of the plurality of codebook entries corresponding to at least one radio resource, and wherein said second scheduling information is encoded based on a second codebook only comprising codebook entries corresponding to radio resources which are not allocated to the first mobile terminal in the first scheduling message.

6. Method according to claim 1, further comprising, before generating the first and second scheduling messages, categorizing said first and second mobile terminals based on their current radio conditions such that the first mobile terminal experiences worse radio conditions than the second mobile terminal, wherein said first robustness level is adapted to radio conditions of the first mobile terminal and said second robustness level is adapted to radio conditions of the second mobile terminal.

7. Method according to claim 1, wherein the plurality of mobile terminals include more than two mobile terminals, the method further comprising:
    before generating the first and second scheduling messages, categorizing the plurality of mobile terminals into groups based on their current radio conditions such that ones of the plurality of mobile terminals experiencing the worst radio conditions are categorized into a first group and ones of the plurality of mobile terminals experiencing better radio conditions are categorized into a second group,
    wherein generating the first and second scheduling messages comprises generating the first and second scheduling messages such that the first scheduling information is indicative of different radio resources allocated to different mobile terminals of the first group, and such that the second scheduling information, when combined with the first scheduling information, is indicative of different radio resources allocated to different mobile terminals of the second group; and
    transmitting the first scheduling message comprises transmitting the first scheduling message to the mobile terminals of both the first and second groups, and transmitting the second scheduling message comprises transmitting the second scheduling message to the mobile terminals of the second group.

8. Method according to claim 1, wherein the first and second robustness levels differ in any of, or any combination of, transmission power and transmission code rate.

9. Method according to claim 1, wherein said radio resources are any of, or any combination of, time slots, spreading codes, frequency allocations, and spatial allocations.

10. A network node configured to allocate radio resources to a plurality of mobile terminals including at least first and second mobile terminals, the network node comprising:
    a processing unit configured to generate a first scheduling message comprising first scheduling information indicative of at least a first radio resource allocated to said first mobile terminal, wherein the processing unit is further configured to generate a second scheduling message comprising second scheduling information, which, when combined with said first scheduling information, is indicative of at least a second radio resource allocated to said second mobile terminal, and wherein the processing unit is further configured to control a transmitting unit of the network node to transmit said first scheduling message to said first and second mobile terminals using a first robustness level, and to transmit said second scheduling message to said second mobile terminal using a second robustness level.

11. The network node of claim 10, wherein the processing unit is configured to generate the second scheduling message such that the second scheduling information is reduced in size compared to a size it would have if it in itself was indicative of the second radio resource allocated to the second mobile terminal, by using a correlation between said first and second scheduling information.

12. The network node of claim 10, wherein the processing unit is configured to generate the second scheduling message such that the second scheduling information is smaller in size than said first scheduling message.

13. The network node of claim 10, wherein said first scheduling information is encoded as a first bitmap or vector, and wherein said second scheduling information is encoded as a second bitmap or vector in which at least one bitmap or vector position associated with a radio resource allocated to the first mobile terminal in the first scheduling message is omitted from the second scheduling information.

14. The network node of claim 10, wherein said first scheduling information is encoded based on a first codebook comprising a plurality of codebook entries, each of the plurality of codebook entries corresponding to at least one radio resource, and wherein said second scheduling information is encoded based on a second codebook only comprising codebook entries corresponding to radio resources which are not allocated to the first mobile terminal in the first scheduling message.

15. The network node of claim 10, further comprising, before generating the first and second scheduling messages, the processing unit is configured to categorize said first and second mobile terminals based on their current radio conditions such that the first mobile terminal experiences worse radio conditions than the second mobile terminal, wherein said first robustness level is adapted to radio conditions of the first mobile terminal and said second robustness level is adapted to radio conditions of the second mobile terminal.

16. The network node of claim 10, wherein the plurality of mobile terminals include more than two mobile terminals, wherein:
    before generating the first and second scheduling messages, the processing unit is configured to categorize the plurality of mobile terminals into groups based on their current radio conditions such that ones of the plurality of mobile terminals experiencing the worst radio conditions are categorized into a first group and ones of the plurality of mobile terminals experiencing better radio conditions are categorized into a second group,
    the processing unit is configured to generate the first and second scheduling messages such that the first scheduling information is indicative of different radio resources allocated to different mobile terminals of the first group, and such that the second scheduling information, when combined with the first scheduling information, is indicative of different radio resources allocated to different mobile terminals of the second group; and the processing unit is configured to control the transmitting unit of the network node to transmit the first scheduling message to the mobile terminals of both the first and second groups, and to transmit the second scheduling message to the mobile terminals of the second group.

17. The network node of claim 10, wherein the first and second robustness levels differ in any of, or any combination of, transmission power and transmission code rate.

18. The network node of claim 10, wherein said radio resources are any of, or any combination of, time slots, spreading codes, frequency allocations, and spatial allocations.

* * * * *

UNITED STATES PATENT AND TRADEMARK OFFICE
CERTIFICATE OF CORRECTION

| | | |
|---|---|---|
| PATENT NO. | : 9,020,550 B2 | Page 1 of 1 |
| APPLICATION NO. | : 13/578993 | |
| DATED | : April 28, 2015 | |
| INVENTOR(S) | : Eriksson et al. | |

It is certified that error appears in the above-identified patent and that said Letters Patent is hereby corrected as shown below:

In The Claims

In Column 16, Line 65, in Claim 2, delete "Method" and insert -- The Method --, therefor.

In Column 17, Line 5, in Claim 3, delete "Method" and insert -- The Method --, therefor.

In Column 17, Line 9, in Claim 4, delete "Method" and insert -- The Method --, therefor.

In Column 17, Line 17, in Claim 5, delete "Method" and insert -- The Method --, therefor.

In Column 17, Line 26, in Claim 6, delete "Method" and insert -- The Method --, therefor.

In Column 17, Line 35, in Claim 7, delete "Method" and insert -- The Method --, therefor.

In Column 17, Line 61, in Claim 8, delete "Method" and insert -- The Method --, therefor.

In Column 17, Line 64, in Claim 9, delete "Method" and insert -- The Method --, therefor.

Signed and Sealed this
Sixteenth Day of February, 2016

Michelle K. Lee
*Director of the United States Patent and Trademark Office*